United States Patent
Day et al.

(10) Patent No.: US 9,466,129 B2
(45) Date of Patent: Oct. 11, 2016

(54) APPARATUS AND METHOD OF PROCESSING BACKGROUND IMAGE OF MEDICAL DISPLAY IMAGE

(71) Applicant: TOSHIBA MEDICAL SYSTEMS CORPORATION, Otawara-shi (JP)

(72) Inventors: Timothy Day, Edinburgh (GB); Steven Reynolds, Edinburgh (GB); Jeffrey Hall, Edinburgh (GB)

(73) Assignee: TOSHIBA MEDICAL SYSTEMS CORPORATION, Otawara-shi (JP)

( * ) Notice: Subject to any disclaimer, the term of this patent is extended or adjusted under 35 U.S.C. 154(b) by 294 days.

(21) Appl. No.: 13/917,120

(22) Filed: Jun. 13, 2013

(65) Prior Publication Data
US 2014/0368526 A1 Dec. 18, 2014

(51) Int. Cl.
*G06T 11/00* (2006.01)
*G06T 5/00* (2006.01)

(52) U.S. Cl.
CPC ............ *G06T 11/001* (2013.01); *G06T 5/008* (2013.01); *G06T 2207/10072* (2013.01); *G06T 2207/10116* (2013.01); *G06T 2210/41* (2013.01)

(58) Field of Classification Search
None
See application file for complete search history.

(56) References Cited

U.S. PATENT DOCUMENTS

| | | | |
|---|---|---|---|
| 2008/0266309 A1* | 10/2008 | Sander et al. | 345/582 |
| 2009/0135250 A1* | 5/2009 | Davidson | A61B 1/00045 348/77 |
| 2010/0054584 A1* | 3/2010 | Schadt et al. | 382/164 |
| 2011/0228997 A1* | 9/2011 | Sharp et al. | 382/131 |
| 2011/0286630 A1* | 11/2011 | Harder et al. | 382/103 |
| 2013/0136328 A1* | 5/2013 | Jansen et al. | 382/131 |
| 2014/0050415 A1* | 2/2014 | Sims | 382/260 |
| 2014/0212036 A1* | 7/2014 | Paris | G06T 3/4092 382/167 |
| 2015/0150522 A1* | 6/2015 | Papaioannou | 378/195 |

FOREIGN PATENT DOCUMENTS

| | | |
|---|---|---|
| JP | 8-166995 | 6/1996 |
| JP | 2007-34518 | 2/2007 |
| JP | 2009-254657 | 11/2009 |

* cited by examiner

*Primary Examiner* — Jacinta M Crawford
*Assistant Examiner* — Diane Wills
(74) *Attorney, Agent, or Firm* — Oblon, McClelland, Maier, Neustadt, L.L.P.

(57) ABSTRACT

Image processing apparatus comprises a memory unit configured to store medical data, and a data processing unit configured to receive medical data from the memory unit and comprising an image generation unit configured to generate a medical display image, the medical display image comprising a background region image and a foreground image derived from the medical data, wherein a brightness of the background image changes in a region between a boundary of the background region and a periphery of the medical display image.

24 Claims, 14 Drawing Sheets

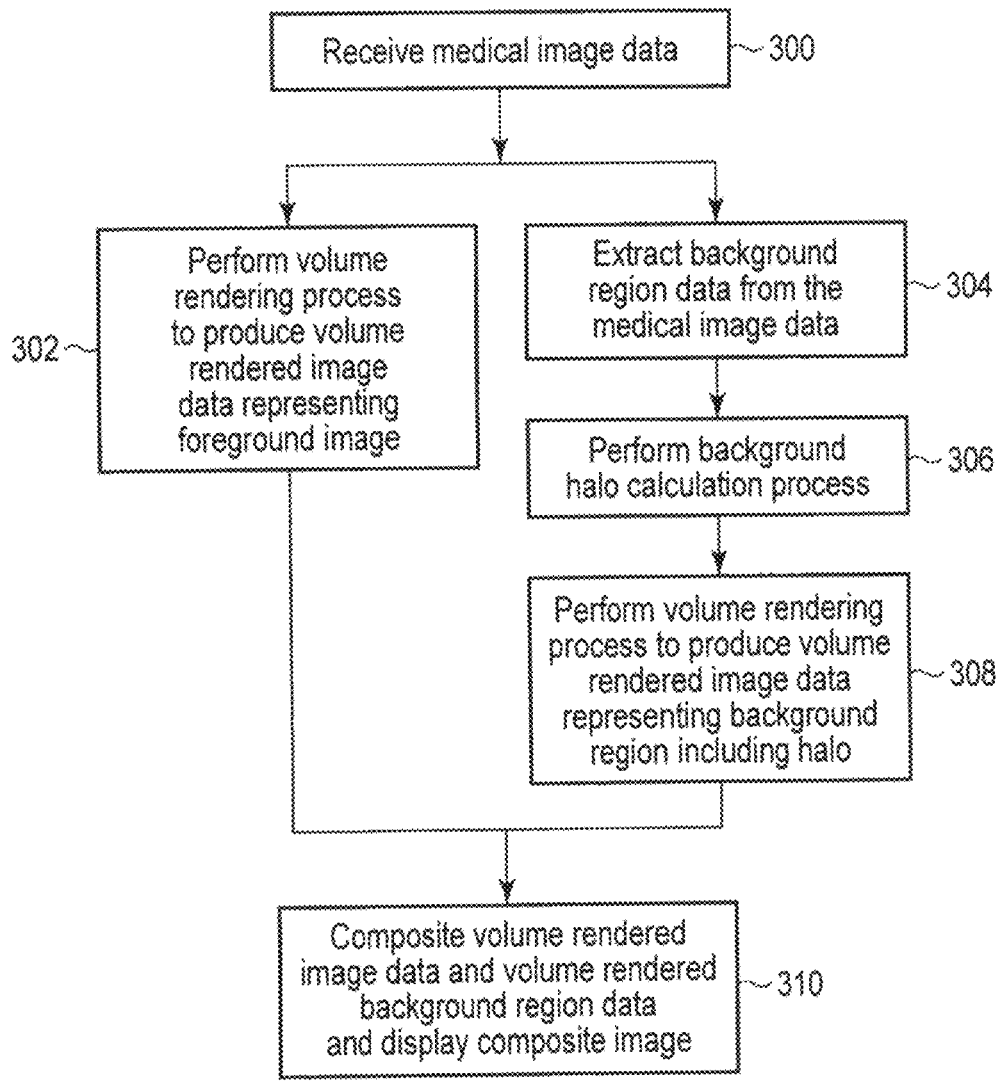
F I G. 5

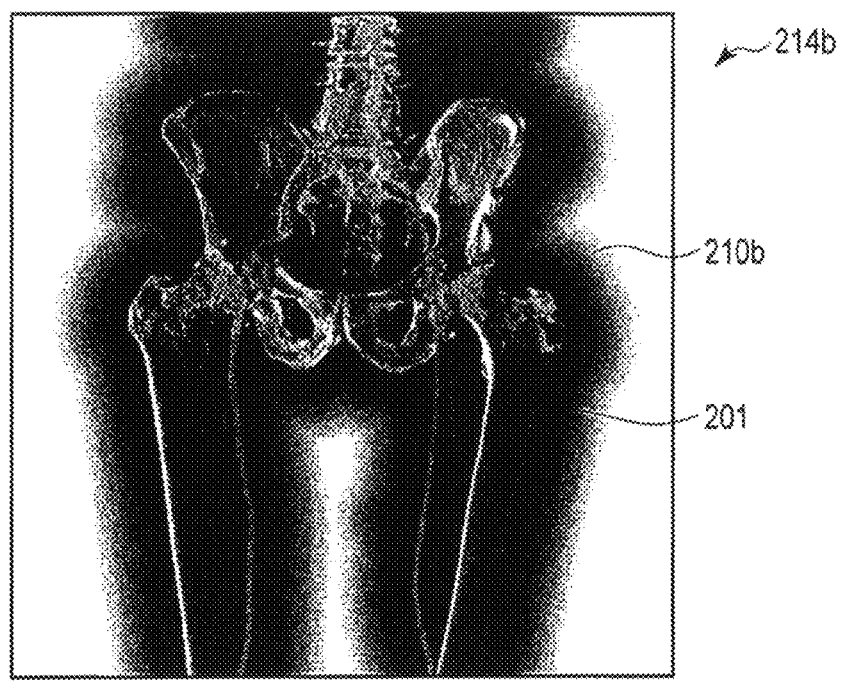
F I G. 7A
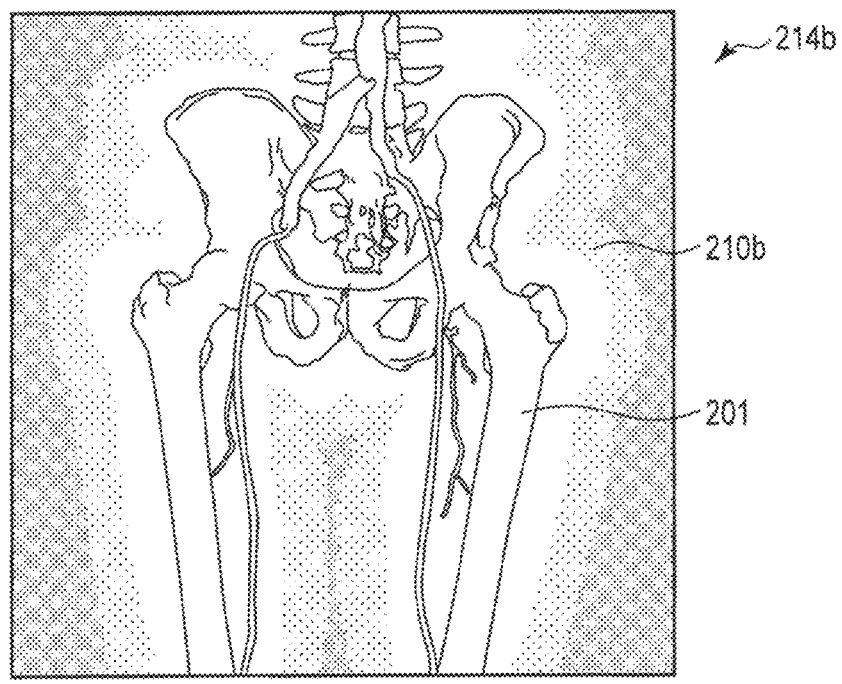
F I G. 7B

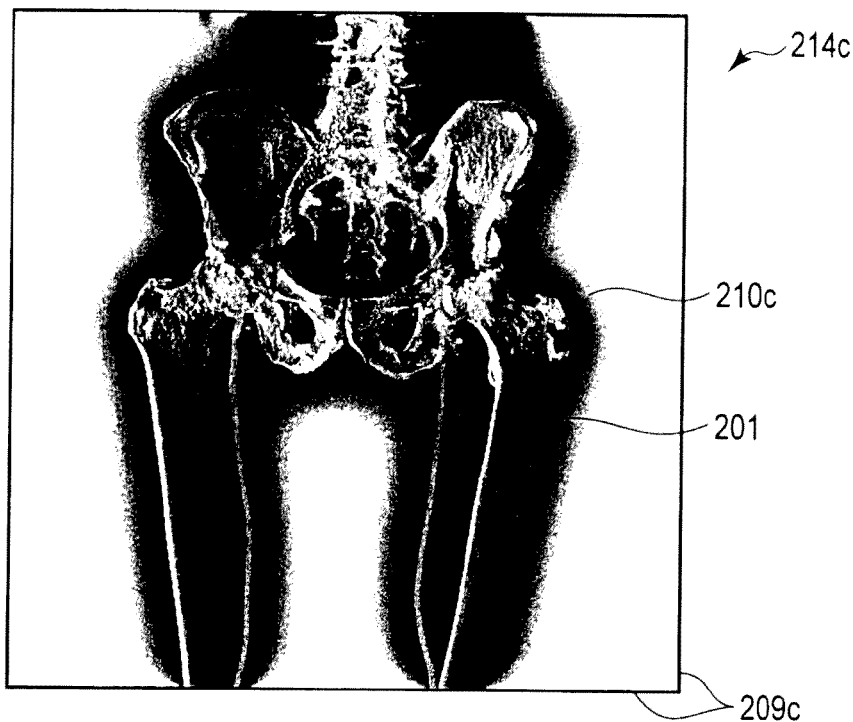
F I G. 8A
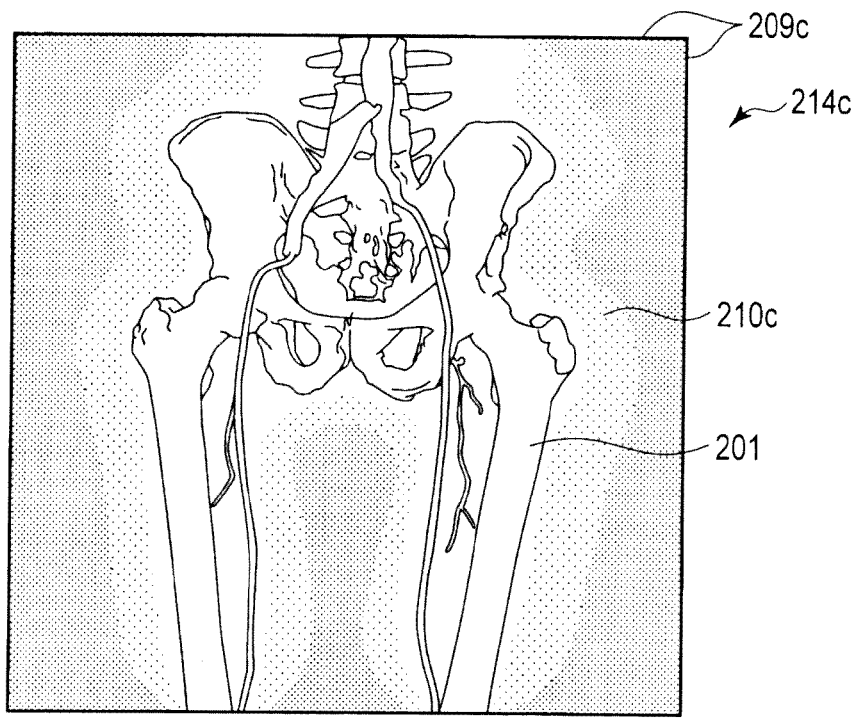
F I G. 8B

APPARATUS AND METHOD OF PROCESSING BACKGROUND IMAGE OF MEDICAL DISPLAY IMAGE

FIELD

Embodiments described herein relate generally to apparatus for, and a method of, processing medical data, for example the processing and displaying of medical images.

BACKGROUND

Clinicians require medical information, and in particular medical display images, to be presented in a manner which enables medical information to be interpreted accurately and quickly.

Certain type of medical images may be associated with a standard format familiar to all clinicians. For example, X-ray images conventionally have a dark or black background and white/grey images corresponding to a subject's tissues. In contrast, in some cases, it may be advantageous for text or graphic information, or shaded volume rendered images, to be displayed with a light background.

Several types of medical image may be viewed at one time, and the dominant background tones of different types of medical image may be incompatible, due to the glare and contrast effects. For example, a very bright image (e.g. having a predominately white background) may impair interpretation of adjacent darker images (e.g. greyscale images on a predominately dark background), and vice versa.

In addition, it may be necessary for medical images to be viewed in either relatively bright or relatively dark environments, as dictated for example by ambient light conditions in hospital wards, operating theatres or instrument suites. Ambient light conditions may not be optimal for viewing medical images. For example, it may be more difficult for a clinician to interpret a medical image having a predominately a white or bright background in a darkened room than it would be to interpret the same image in a well lit room.

FIG. 1 illustrates how contrast effects can influence the visual interpretation of data. The mid-grey tone of rectangle 1 is perceived by at least some people as being lighter when displayed on a dark grey background 2, than when displayed on a light grey background 3.

When interpreting medical data, in particular medical images, effects of this type can lead to errors, delays or eye fatigue.

FIGS. 2a and 2b show a medical display 10, which includes a shaded volume rendered (SVR) image 12 of a human pelvis derived from CT data, adjacent to three multi-planar reformatted (MPR) images 14, 16, 18 derived from the CT data. Glare and contrast effects caused by the much brighter SVR image 12 makes the darker MPR images more difficult to interpret, particularly in a darkened instrument room. FIG. 2b is a representative line-drawn version of FIG. 2a, but with all backgrounds shown in white.

Changing the format of an image may alleviate contrast effects, but images displayed in an unconventional format may be more difficult for clinicians to interpret. For example, the white background of the SVR image 12 of FIG. 2a may be changed to a black background for consistency with the MPR images. However, whereas glare and contrast effects are reduced, fine structure of the SVR image cannot be clearly seen on a black background.

As a compromise, the SVR image 12 could be displayed on a grey background. However, some fine structure of the compromise SVR image remains difficult or impossible to decipher and the glare/contrast effects on adjacent MPR images are reduced only to some extent.

BRIEF DESCRIPTION OF THE DRAWINGS

Embodiments are now described, by way of non-limiting example, and are illustrated in the following figures in which:

FIG. 5 is a flow chart illustrating in overview an alternative mode of operation of the embodiment of FIG. 3.

FIGS. 7a and 7b show a medical display image resulting from the application of a distance based algorithm to background region data. The line drawing of FIG. 7(b) is derived from the original image of FIG. 7(a).

FIGS. 8a and 8b show a medical display image resulting from the solution of a Laplace equation based on boundary conditions applied to the background region data. The line drawing of FIG. 8(b) is derived from the original image of FIG. 8(a).

DETAILED DESCRIPTION

According to an embodiment, there is provided image processing apparatus comprising a memory unit configured to store medical data, and a data processing unit configured to receive medical data from the memory unit and comprising an image generation unit configured to generate a medical display image, the medical display image comprising a background region image and a foreground image derived from the medical data, wherein a brightness of the background image changes in the background region between a boundary of the background region and a periphery of the medical display image.

In an embodiment, there is provided a method of processing medical data, comprising generating a medical display image, the medical display image comprising a background region image and a foreground image derived from the medical data, wherein a brightness of the background image changes in the background region between a boundary of the background region and a periphery of the medical display image.

Figure 1:
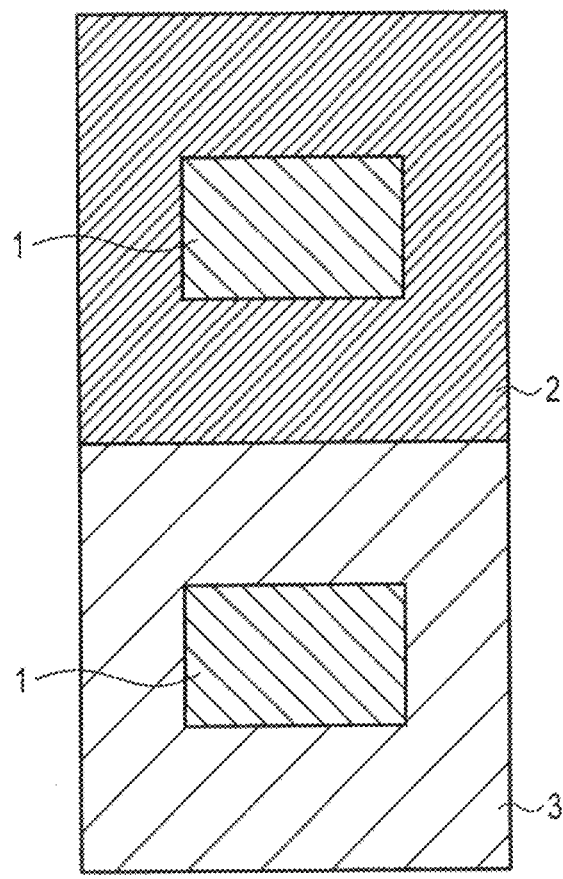
FIG. 1 illustrates a contrast effect on the perception of a shaded rectangle.
Figure 2A:
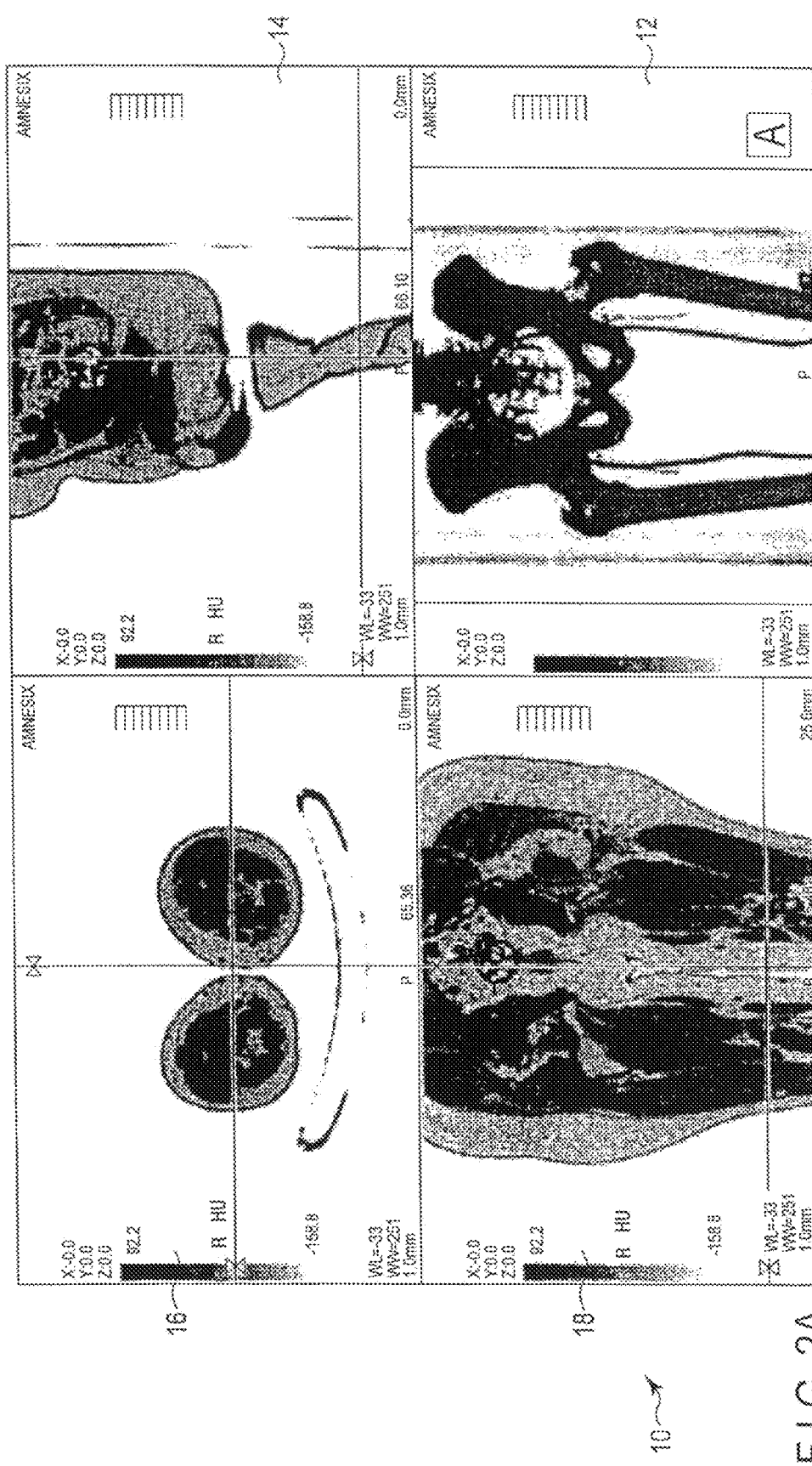
FIGS. 2a and 2b shows a medical display comprising MPR and SVR images displayed in a standard format. Line drawings of FIG. 2(b) are derived from original images of FIG. 2(a).
Figure 2B:
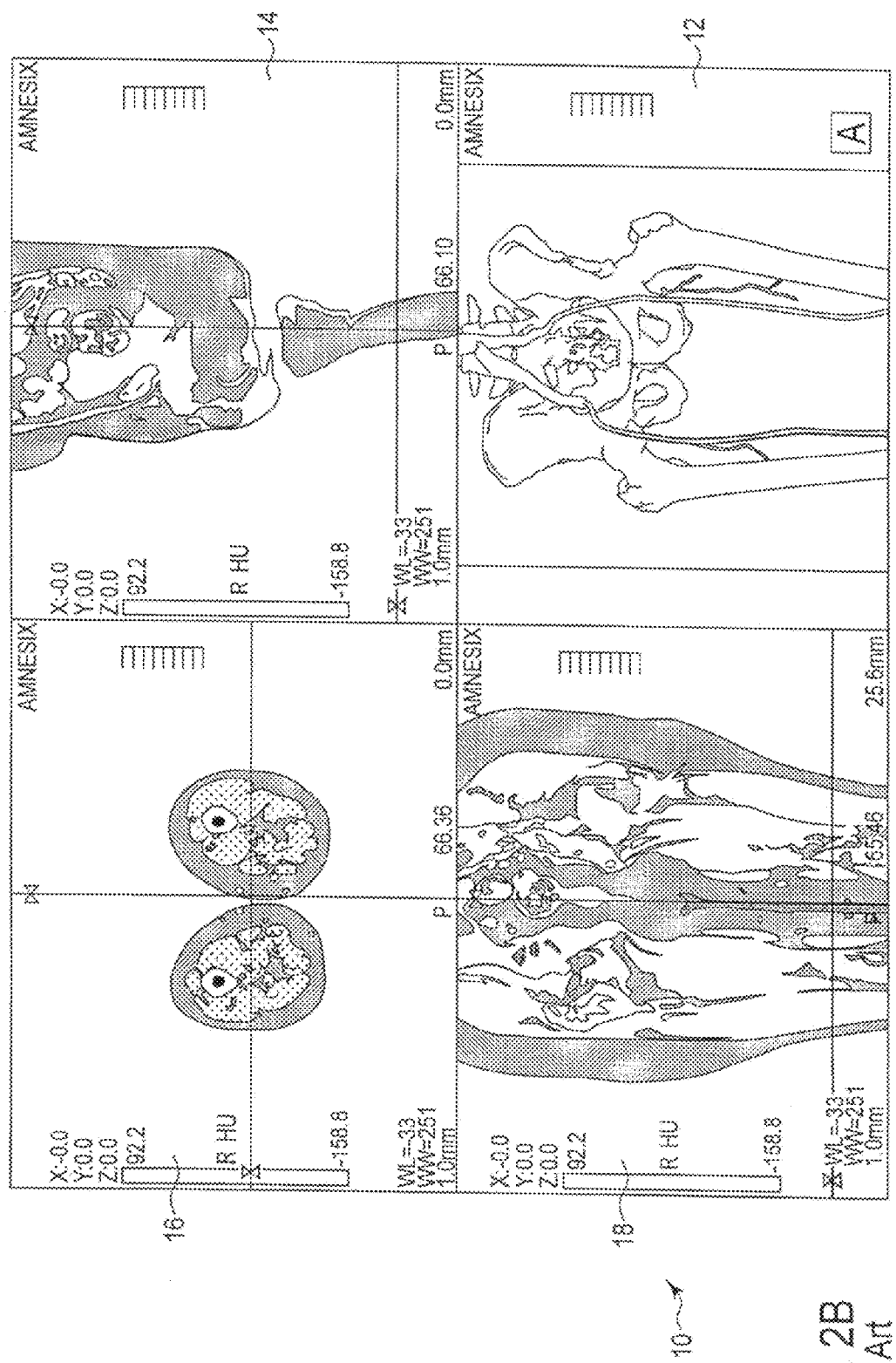
Figure 3:
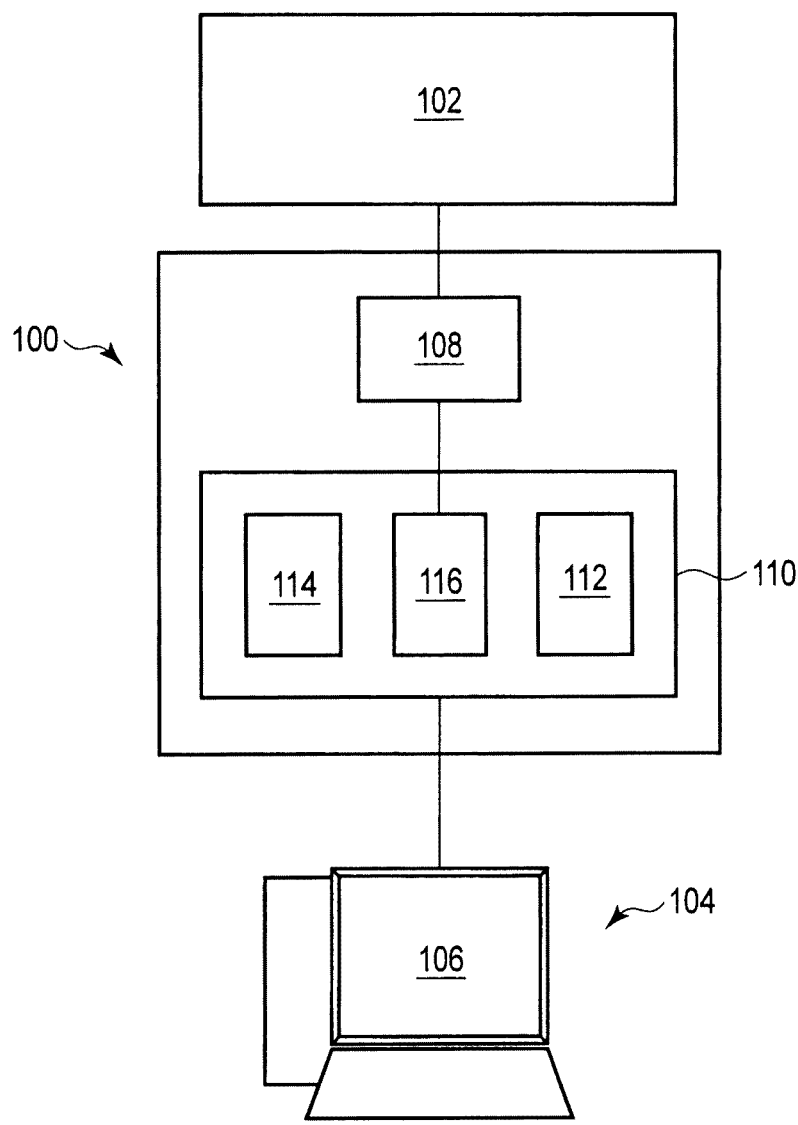
FIG. 3 is a schematic diagram of medical data processing apparatus according to an embodiment.

A medical image data processing apparatus 100 according to an embodiment is illustrated schematically in FIG. 3. The medical image data processing apparatus 100 is connected to a CT scanner 102 and a user interface 104, which includes a display screen 106.

The medical image data processing apparatus has a memory unit 108 and a data processing unit 110 in communication with the memory unit.

The memory unit 108 is configured to receive and store medical data from the CT scanner. The memory unit may alternatively or in addition be configured to receive medical data from other medical instruments (e.g. a MRI instrument, PET scanner or over a network).

In the mode of operation described below in relation to the flow chart of FIG. 4, the stored medical data is stored volumetric medical image data, for example an array of voxels representing intensity values as a function of three-dimensional position.

The data processing unit is configured to receive medical data from the memory unit and has a rendering/segmentation unit 116, an extraction unit 112, and an image generation unit 114. The rendering/segmentation unit 116 is configured to perform known volume rendering and segmentation processes on the stored medical data if required, and the extraction unit is configured to extract background region data related to the medical data. The image generation unit is configured to generate a background image derived from the background region data, and a medical display image comprising the background image derived from the background region data, and a foreground image derived from the medical data, for display on the display screen. Alternatively, or in addition, the generated medical display image may be stored (for example as an image file, stored by the memory unit) or output to another device (for example across a network, or to a printer).

The processing apparatus 100 also includes a hard drive and other components of a PC including RAM, ROM, a data bus, an operating system including various device drivers, and hardware devices including a graphics card. Such components are not shown in FIG. 3 for clarity. Any suitable processing apparatus may be used in alternative embodiments.

Figure 4:
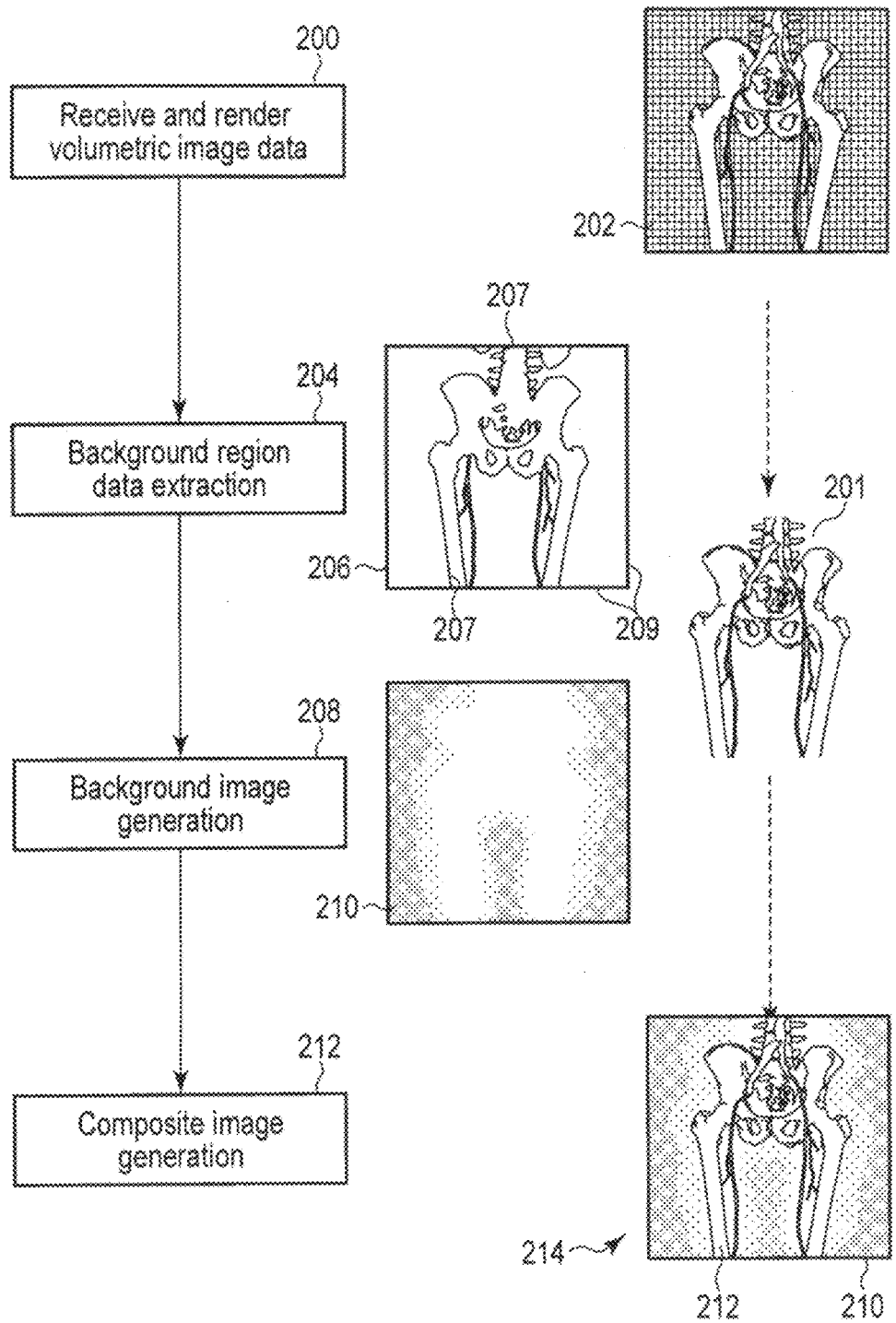
FIG. 4 is a flow chart illustrating in overview a mode of operation of the embodiment of FIG. 3.

The medical image data processing apparatus shown in FIG. 3 is configured to perform a process having the sequence of stages illustrated in the flowchart of FIG. 4.

At stage 200 medical data, in this case volumetric image data, is received by the rendering/segmentation unit 116 and is subject to known volume rendering and segmentation processes. Any such known volume rendering and segmentation processes may be applied, for example as selected by a user. In the example shown, the medical data is subject to segmentation process that segment bone and blood vessels, and a shaded volume rendering process, to produce a set of volume rendered image data 202. The volume rendered image data consists of an array of pixels, each having a coordinate value and a value of colour and/or opacity, with opacity for example represented by an alpha channel. In FIG. 4, areas where the opacity pixel values are below a threshold, and are effectively transparent, are represented with a background chequerboard pattern, for the purposes of illustration.

At stage 204, the extraction unit conducts a background region data extraction procedure, in order to extract background region data 206 from the volume rendered image data 202. Any suitable procedure can be used to extract the background region data, which is related to the medical data. In the example shown, the extraction unit assigns all pixels having an opacity value below a predetermined threshold value to the background region data. The other pixels, not extracted as background region data, may be classified as foreground region data.

At stage 208, the image generation unit 114 generates a background image which is derived from the background region data extracted at stage 204. The background image is generated to have an appearance that changes with position relative to a boundary of the region represented by the background region data. In the present example, the image generation unit generates a background image 210 having a "halo" region extending from the boundaries 207 which gradually changes from white to black (illustrated only schematically in Figure using dotted regions). Thus, the background image may be considered to change brightness in the background region between a boundary of the background region and a periphery of the medical display image.

Two examples of boundaries 207 of the background data set, which in this case can be considered to be boundaries between the foreground image and the background image are labelled in FIG. 4 by way of example.

At stage 212, the display image generation unit generates a medical display image 214 which is a composite of the foreground image 201 and the background image 210. The foreground image is derived from the medical data and, in the example shown, consists of the non-transparent pixels of volume rendered image data 202. The background image is an image derived from the background region data extracted at stage 204.

As mentioned above, it can sometimes be useful to display SVR images on a background with a light tone (e.g. white). The light halo of the medical display image 214 around the non-transparent pixels of the SVR image 201 enables the fine structural features to be seen. The darker regions of the background image 210 reduce the overall brightness of the medical display image, which enables the medical display image to be comfortably viewed in dark ambient light and/or adjacent to other medical images having a generally dark background.

In the mode of operation described in relation to the flow chart of FIG. 4, the stored medical data is volumetric medical image data, which is then subject to volume rendering processes to produce two-dimensional volume rendered image data. The background image data is then extracted by the extraction unit 112 from the volume rendered image data. In alternative embodiments, the extraction unit 112 is configured to extract the background region data from the volumetric medical image data prior to volume rendering, for example by comparison of intensity and/or opacity values of the voxels of the volumetric medical image data to a threshold or via any other suitable procedure. Operation of such an embodiment is illustrated in overview in FIG. 5.

At the first stage 300 the data processing unit 110 receives medical image data from the memory unit 108. As was the case in the process of FIG. 4, the medical image data in this case is volumetric image data comprising an array of voxels representing intensity as a function of position.

In the process of FIG. 5, the extraction unit 112 identifies and extracts volumetric background data from the volumetric image data at stage 304, by applying suitable segmentation algorithms to identify the boundaries of regions of interest in the volumetric data set in three dimensions, with voxels outside the regions of interest being identified as background region voxels. The algorithms may perform simple thresholding processes to identify regions of interest, also referred to as foreground regions, and to identify background regions, but may also include more sophisticated segmentation processes. The algorithms used to determine the background regions will usually depend on the nature of the regions of interest, which can be determined from user input or from stored control parameters.

At the next stage 306, the image generation unit processes the identified volumetric background region data by performing a background halo calculation process to calculate a halo effect. The halo effect in this case can be represented by assigning colour values and/or opacity values to voxels of the background region data in three dimensions or, alternatively, assigning graded intensity values to the voxels of the background region data that would produce the desired halo effect when rendered. In both cases the assigned values will usually vary with distance from the boundary of the background region, such that when the background image data is rendered a halo effect (for example, a gradual fading from white to black) is seen in the resulting rendered image.

At the next stage 308, a volume rendering process, for example a maximum intensity projection (MIP) process, is performed on the background region data including the halo data, to produce a volume rendered image of the background region, including the halo effect, such as the image 210 shown in FIG. 4.

Either in parallel with, or before or after stage 304 to 308, a segmentation and volume rendering process is performed on the volumetric medical image data to produce a volume rendered image, which may be referred to as the foreground image and which represents the regions of interest.

At the next stage 310, the background image and the foreground image are composited together to form a composite image including a halo effect around the subject of interest.

It is a feature of the embodiment of FIG. 5 that the background extraction process does not have to be repeated each time the rendered image is subject to manipulation by a user causing display of a new view, for example when a user rotates the rendered image. Instead, the volumetric background region data is merely rendered in accordance with the new view to produce the halo effect in the resulting image.

It can be understood that that the background region data can be either two or three dimensional background region data (for example, in the form of pixels or voxels) and the background image can be a two dimensional or three dimensional representation of the background image data.

In alternative embodiments, the stored medical data is previously rendered medical image data, also referred to as pre-rendered medical image data, and the process of FIG. 4 may be used, omitting the rendering at stage 200. The pre-rendered data may be stored 2D data including opacity data, obtained from an earlier rendering of volumetric image data. The generation of the halo effect may subsequently be performed using the stored 2D data, without access to the original volumetric data if so desired. The background region data is extracted and the background image generated in accordance with stages 204 and 208 of FIG. 4. The composite image, including the halo effect, is then generated as described above in relation to stage 212 of FIG. 4, thus adding a halo effect to the previously rendered image data.

As mentioned above, the image generation unit is configured to conduct one or more position-dependent transformations at stage $208_{[DOMA1]}$ in order to generate the background image. Examples of the results of such position-dependent transformations on the appearance of a medical display image according to various embodiments are shown in FIGS. 6 to 8. The position-dependent transformations may compute the appearance of each background region pixel in dependence on the distance to the nearest foreground pixel.

The position-dependent transformation that is used for a particular embodiment or particular set of data can depend on user preference, for example, preferred appearance of halo, and/or can depend on the nature of the image data or rendering. The position-dependent transformation may be selected to avoid artifacts or undesirably abrupt or extreme variations of colour or brightness within the halo region itself.

Figure 6A:
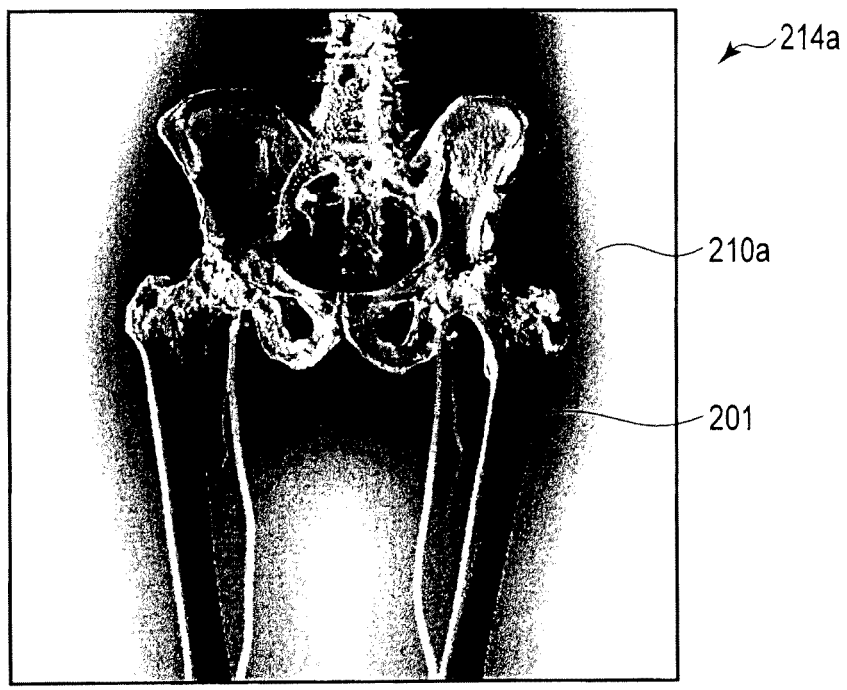
FIGS. 6a and 6b show a medical display image resulting from the application of a Gaussian blur to background region data. The line drawing of FIG. 6(b) is derived from the original image of FIG. 6(a).
Figure 6B:
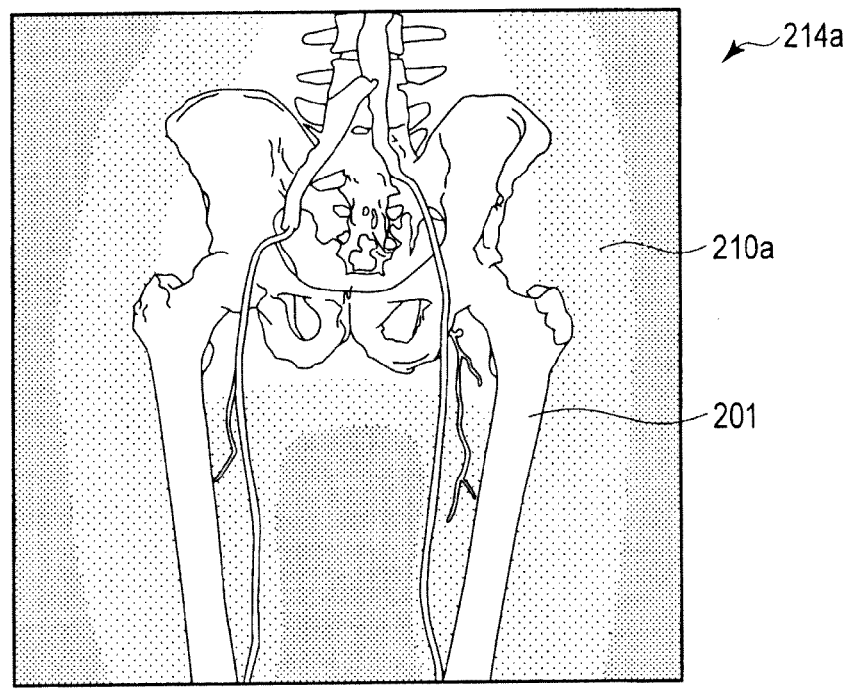

In the mode of operation illustrated in FIG. 4, the image generation unit is configured to apply a blur to background image data 206 by applying a Gaussian blur. FIGS. 6a and 6b show a medical display image 214a which is a composite of foreground image 201 and a background image 210a derived from the background image data 206 by applying a Gaussian blur. The position-dependent transformation (in this case the Gaussian blur) causes the tone of the background image 210a to gradually change in the regions extending away from the boundaries 207. The brightness of the background image changes in the background regions between a boundary of the background region and a periphery of the medical display image. FIG. 6b is a representative line-drawn version of FIG. 6a.

The term "tone" may be considered to represent one or both of colour and brightness. For example a particular region may have a particular colour, for example blue, and the tone of that region may be varied by varying the colour and/or by varying the brightness.

In alternative embodiments, other blur functions may be applied, such as exponential blurring, Lorentzian blurring, or sine blurring, or combinations of two or more blur functions or other position-dependent transformation.

In another embodiment, the image generation unit is configured to apply an algorithm to the background image data to cause the tone of the background image to change as a function of distance from the nearest boundary. FIGS. 7a and 7b show a medical display image 214b which is a composite of foreground image 201 and a background image 210b derived from the background image data 206 by applying a distance based algorithm. The position-dependent transformation, the distance based algorithm, causes the tone of the background image 210b to gradually change from white in the regions extending away from the boundaries 207, to black at a predetermined distance from the boundaries. The brightness of the background image changes in the background regions between a boundary of the background region and a periphery of the medical display image. FIG. 7b is a representative line-drawn version of FIG. 7a.

In another embodiment, the image generation unit is configured to solve a differential equation with boundary conditions based on the peripheries and the boundaries of the background region data. FIGS. 8a and 8b shows a medical display image 214c which is a composite of foreground image 201 and a background image 210c derived from the background image data 206 by solving a Laplace equation, in this case having a boundary condition of 0 at the boundaries of the background region data 206 and a boundary condition of 1 around the periphery 209 of the background region data. This causes the tone of the background image 210c to gradually change from white in the regions extending away from the boundaries 207, to black around the periphery 209c of the medical display image. The brightness of the background image changes in the background regions between a boundary of the background region and a periphery of the medical display image. FIG. 8*b* is a representative line-drawn version of FIG. 8*a*.

Figure 9A:
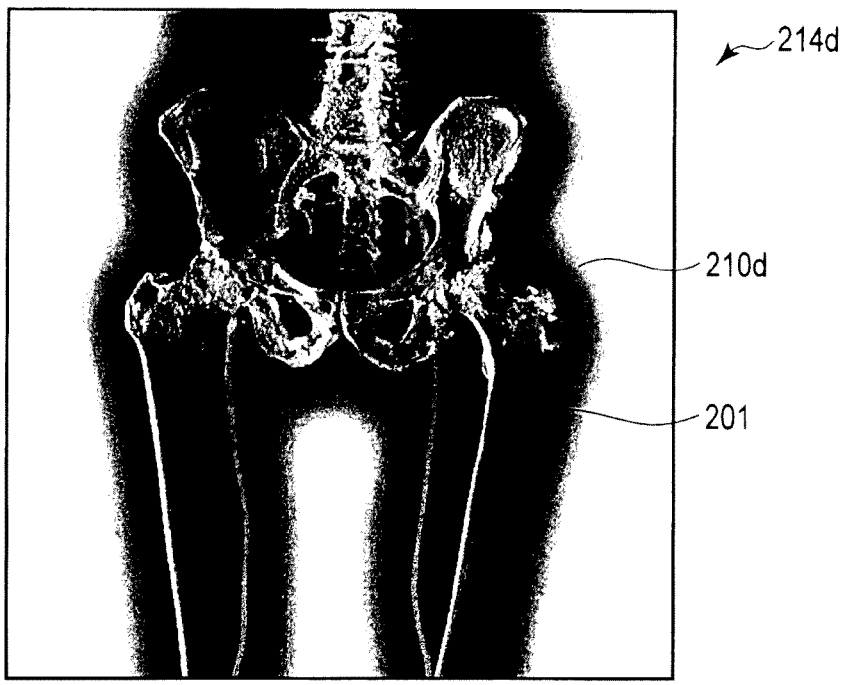
FIGS. 9a and 9b show a medical display image resulting from the application of both a distance based algorithm and a Gaussian blur to the background region data. The line drawing of FIG. 9(b) is derived from the original image of FIG. 9(a).
Figure 9B:
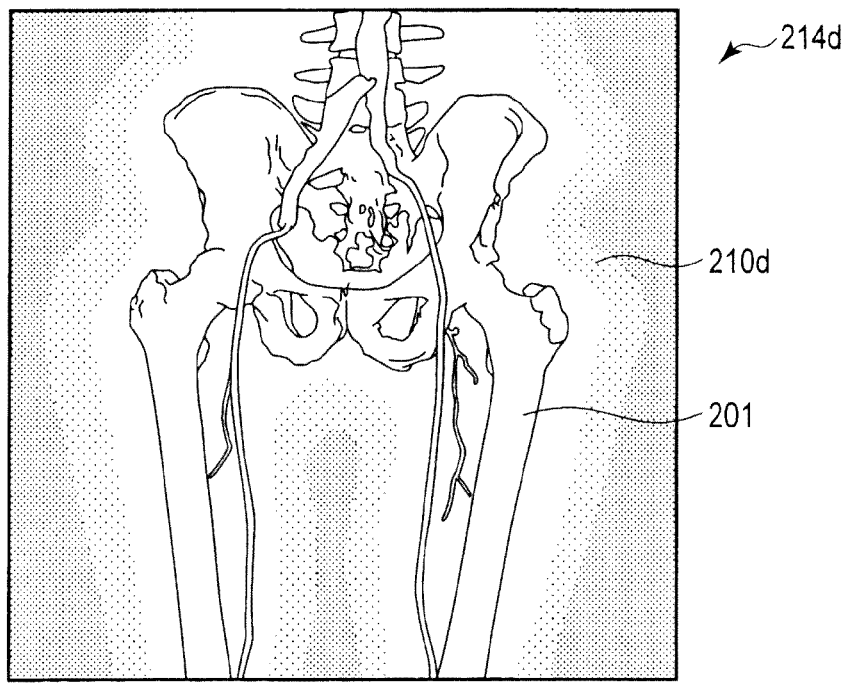

In another embodiment, the image generation unit is configured to perform more than one position-dependent transformation. FIGS. 9*a* and 9*b* show a medical display 214*d* which is a composite of foreground image 201 and a background image 210*d* derived from the background image data 206 by firstly applying a distance based algorithm to the background region data 206, to generate a background image 210*b*, and secondly by applying a Gaussian blur to the background image 210*b*, to generate background image 210*d*. The brightness of the background image changes in the background regions between a boundary of the background region and a periphery of the medical display image. FIG. 9*b* is a representative line-drawn version of FIG. 9*a*.

The position-dependent transformation, or properties thereof, may be selectable by way of the user interface device.

The particular blur function, or other position-dependent transformation, that is used can be selected in dependence on the type of image data, or the nature of the anatomy or other feature that is the subject of the foreground image, in order to provide the clearest or least distracting image. In some cases, depending on the shape of the foreground image, and the nature of the blur or other position-dependent transformation, the variation in colour or brightness of the background image can produce concentrations of colour or brightness that some users may find distracting. The position-dependent transformation can be selected in order to avoid such distracting concentrations.

In the examples shown, the background region changes in brightness from white or a pale grey, to black or a darker grey. In alternative embodiments, alternatively or in addition to brightness, the colour of the background image can gradually change. In some embodiments (for example where the medical display image relates to medical data conventionally displayed on a bright background) the brightness of the background image changes from a dark tone to a light tone, in the regions extending from the boundaries.

In an alternative embodiment, the tone of the background image (i.e. the colour and/or brightness) may be modified, and/or an outline in a first tone of a predetermined width may be applied to the boundaries and a second tone applied to the remainder of the background image.

Figure 10A:
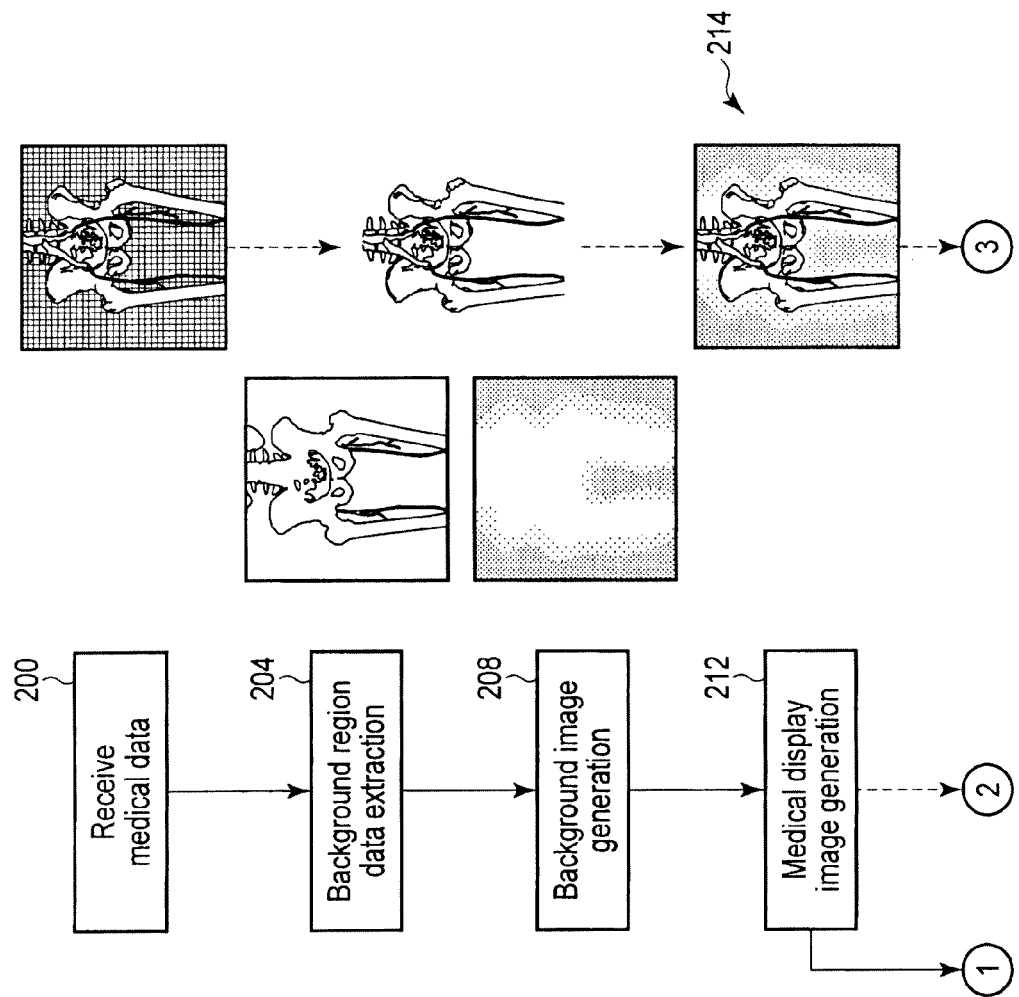
FIGS. 10A-10C are a flow chart illustrating in overview another mode of operation of an embodiment of FIG. 3, for generating and manipulating a medical display.
Figure 10B:
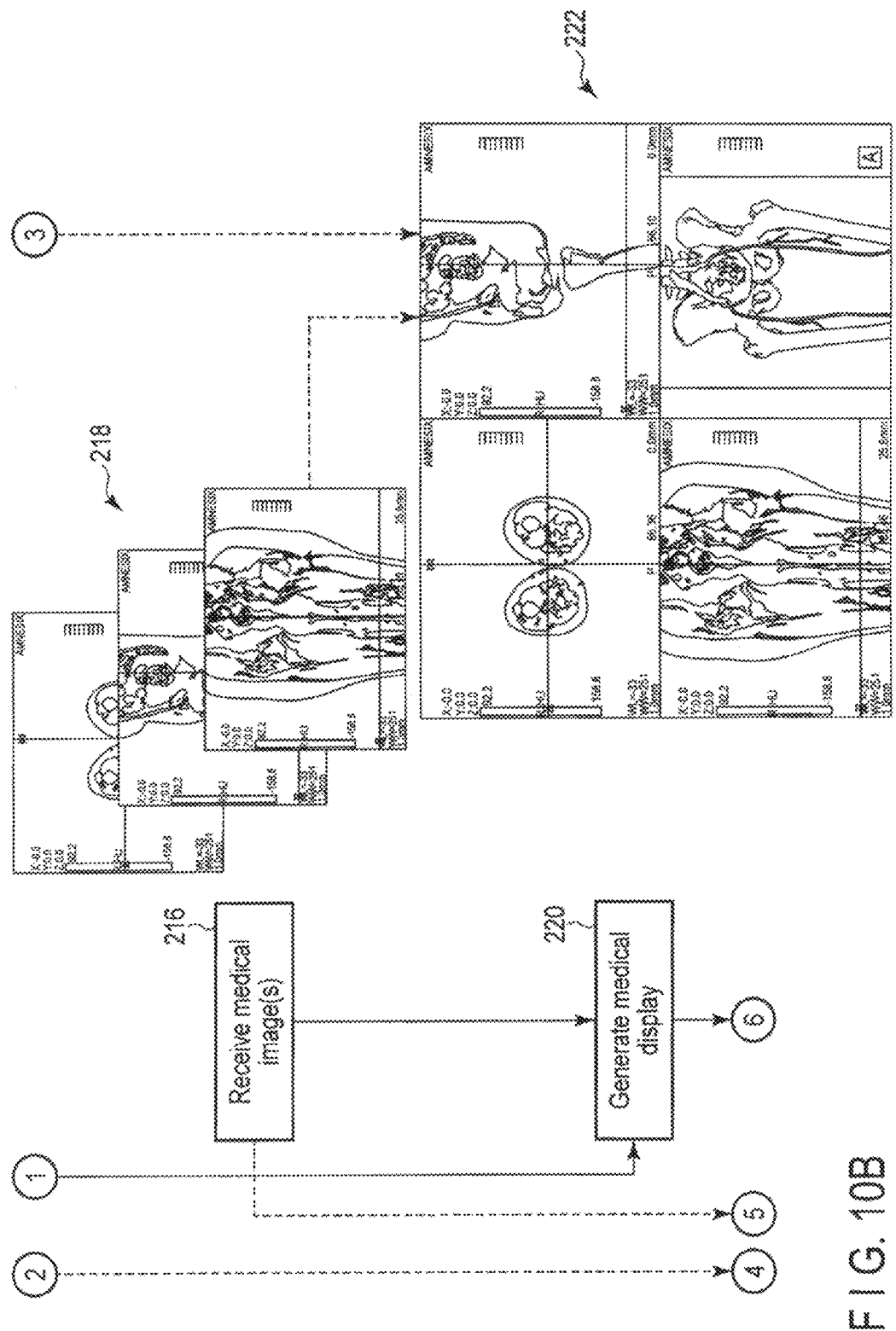
Figure 10C:
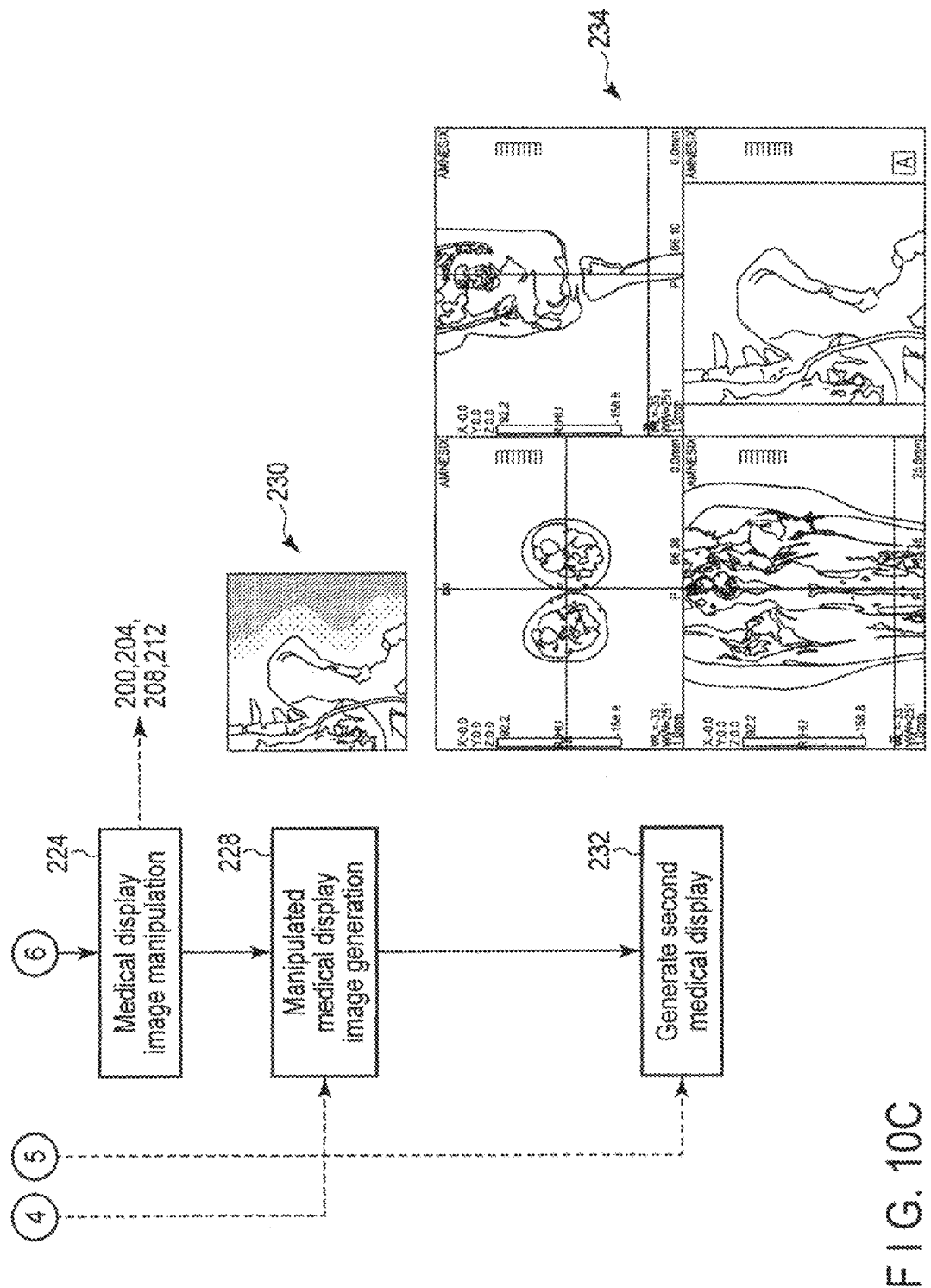

Medical image data processing apparatus 100 is configured to perform additional processes in alternative embodiments or modes of operation. One such embodiment is illustrated in the flowchart of FIG. 10. The medical image data processing apparatus is configured to perform stages 200, 204, 208 and 212 as described above in relation to FIG. 3, so as to generate a medical display image 214, as described above, before performing further stages 216, 220, 224, 228 and 232.

At stage 216, the medical image data processing apparatus is configured to receive one or more further medical images 218. The one or more further medical images are stored by the memory unit. The one or more further medical images are received by the data processing unit (for example from another device, from the memory unit or across a network). The one or more further medical images may be generated by the data processing unit and may be related to medical data stored by the memory unit.

At stage 220, the image generation unit is configured to generate a medical display 222, in which the medical display image 214 is adjacent to the one or more further medical images 218.

The medical display image may be a different type of image to the one or more further images and may conventionally be associated with a different standard format.

In the example shown, the one or more further medical images are MPR images derived from CT data and the medical display image comprises an SVR image derived from CT data. As mentioned above, in standard format, MPR images are displayed on a dark or black background and SVR images are displayed on a light or white background. However, the medical display 222 comprises a medical display image 214 in which the background image gradually changes to the dominant black background tone of the adjacent medical images and thus the medical display 222 is easier to read.

In an embodiment, the data processing unit is configured to detect the dominant background tone of the one or more further medical images (e.g. by determining a median tone value around a periphery of a further medical image) and the image generation unit may be configured to generate a medical display image having background image with the same dominant background tone. For example, the background image may gradually change tone (for example from the standard background tone of SVR images) to the dominant background tone of the one or more further medical images.

At stage 224, the medical data processing apparatus is configured to allow for the medical display image to be manipulated, responsive to input to the user interface. For example, a user may wish to zoom in or out, or to pan or scroll across an image, to rotate, or to enlarge, reduce, sculpt or edit an image. The manipulating of the medical display image results, at stage 228, in the generation of a further, manipulated medical display image 230. Manipulation may cause stages 200, 204, 208 or 212 to be repeated, or may cause only some stages to be repeated (for example stages 204, 208 and 212, or stages 208 and 212 only).

At stage 232, a second medical display 234 is generated, in which the further medical display image 230 is adjacent to the one or more medical images 218.

In some embodiments, the image generation unit is configured to cause the background image of the medical display image to change to a single tone during image manipulation, for example responsive to input to the user interface. For example, a background "halo" image may be caused to change (gradually or in a single step) to a single tone. For example, in some circumstances, manipulation of an image having a background with a single tone (e.g. a compromise mid-grey background or constant white background) may be less distracting to a user than manipulation of an image with a background halo. Once input has ceased, for example once an image manipulation such as pan, zoom, rotate, or delete has ceased, the background image then fades back to a new background halo image. Alternatively, the background image may change to the new background halo image immediately once input has ceased.

In other embodiments, the image generation unit is configured to generate a series of background images in "real time" during manipulation of the medical display image. For example, the image generation unit may be configured to smoothly (i.e. in a series of frames) zoom, pan or rotate the foreground image and to generate and display a background image associated with each frame of the foreground image. In some cases, a 3D halo volume is generated, which represents a halo around the target region of the foreground image. The displayed halo effect of the background image is then generated by rendering of the halo volume, for example using a maximum intensity projection (MIP) of the halo volume.

The background region data may be three-dimensional background region data in the form of an array of voxels and each background image may be generated from the three dimensional background region data.

In some embodiments, the extraction unit is configured to extract first and second background region data. The first background region data may comprise pixels or voxels having an opacity value below a first threshold, or within a first band, and second background region data may comprise pixels or voxels having an opacity value below a second threshold, or within a second band. The first and second thresholds may correlate with different tissue types, or may be associated with particular physiological features. It is known for example to administer contrast agents to a patient prior to obtaining medical data. Contrast agents may accumulate at certain tissue types, e.g. in the region of a tumour or in the vascular system, resulting in particularly high intensity values of pixels/voxels of acquired medical data corresponding to these regions.

Data processing algorithms are known in the art for identifying potential regions of medical interest from medical image data and the extraction unit may be configured to execute such algorithms and extract second background region data.

The image generation unit may be configured to generate more than one background image. In some embodiments, a first background image changes gradually from a first tone and a second background image changes gradually from a second tone. For example, the first background image may have a pale or white halo and the second background image may have a coloured (e.g. red) halo.

Figure 11:
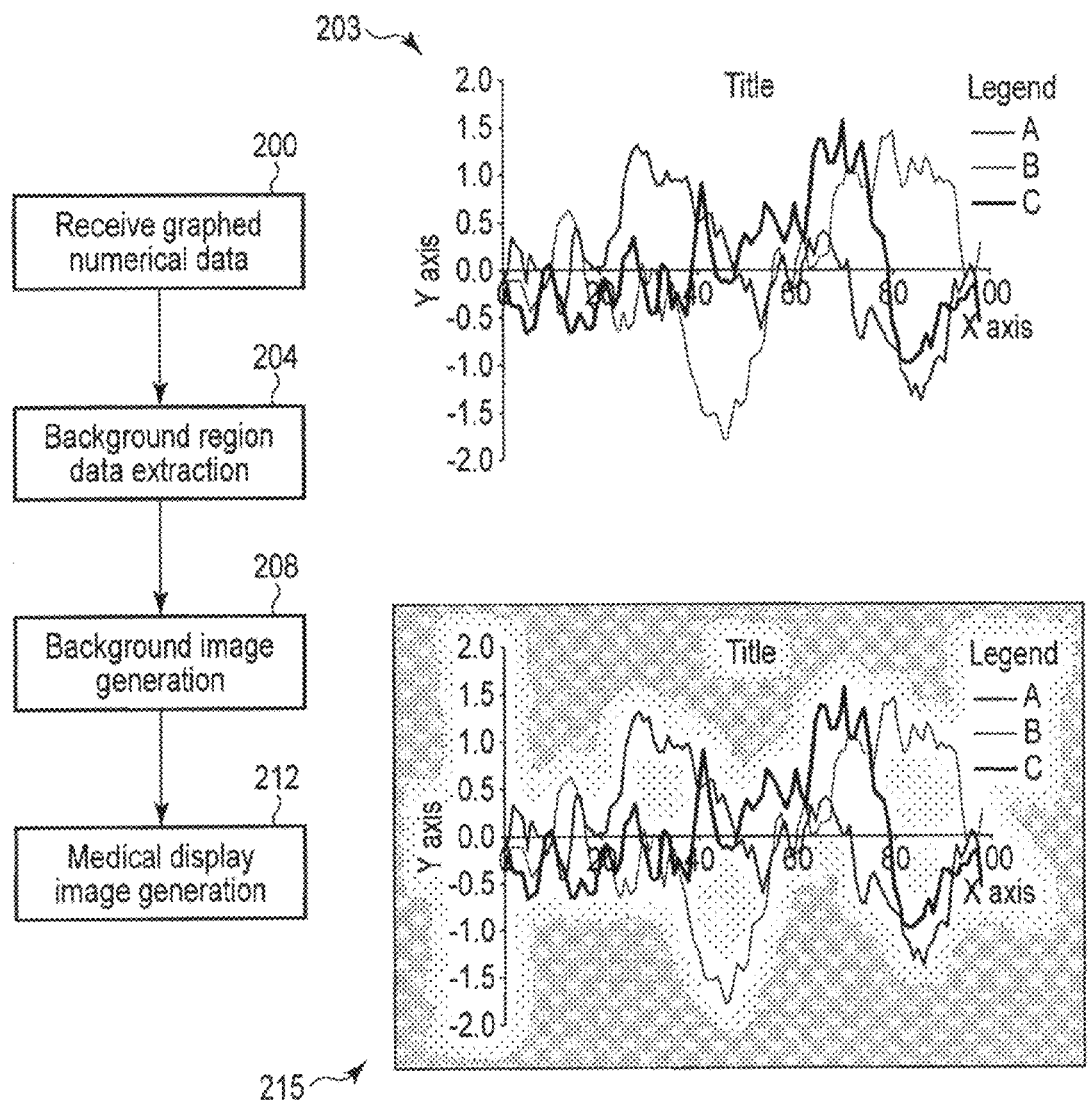
FIG. 11 is a flow chart illustrating in overview a mode of operation of an embodiment of FIG. 3, for generating a medical display image relating to graphed numerical data.

The medical data may be medical image data (for example SVR image data as described above). Alternatively, the medical data may be another form of data, such as graphed numerical data (as shown in FIG. 11). Such data may be stored by the memory unit and/or may be in the form of raw data (which may be processed by the processing unit to generate graphed numerical data) or may be in the form of pre-processed data in an image file format (e.g. jpeg, pdf), for example in a format output by another device.

FIG. 11 shows operation of the medical data processing apparatus 100, in which graphed numerical data 203 in an image file format is received by the data processing unit, at stage 200. Background region data is extracted by the extraction unit (stage 204) and a background image is generated by the image generation unit (stage 208) in the manner described above. At stage 212 a medical display image 215 is generated, which comprises a foreground image derived from the graphed numerical data 203 and a background image derived from the background region data. The medical display image 203 has a predominantly dark background and a pale halo around the axes and plots of the graphed numerical data 203, and may be comfortably viewed in dim ambient light and/or adjacent to medical images having a predominantly dark background. The halo is represented in FIG. 11 by dotted regions. The brightness of the background image changes in the background regions between a boundary of the background region and a periphery of the medical display image.

The medical data and medical display image may be related to any type of medical image or medical information, including but not limited to X-ray data, CT data, MRI data, PET data, SPECT data, ultrasound data, parametric data such as blood values or spectroscopic data or numerical data.

A medical display may comprise any combination of one or more of the above types of medical data.

Although the embodiment of FIG. 3 generates a background image that varies with position relative to a boundary of the background region, any other suitable variation of background image with position may be provided in alternative embodiments. For example the variation of the appearance of the background image with position may be determined in dependence on one or more other properties of the foreground image, background image, or anatomy that is represented by the foreground image, as well as or instead in dependence of the position of the boundary.

In some embodiments, the appearance of the background image is varied in dependence on the proximity of anatomical or other features of interest. For example, in some embodiments the presence in the foreground image of one or more PET hotspots, stenoses or other features of interest identified using computer aided diagnosis routines, causes the background image near to such items to change appearance, for example to change colour, brightness or texture. Thus, for example, a background halo may be displayed, with the colour of the background halo varying near a feature of interest in the foreground image. In such fashion, the background image may draw attention to the feature of interest. The background halo may, for example, be predominantly white, but may fade to another colour (for example red) near a feature of interest.

Whilst embodiments have been described in which tone (either or both colour or brightness) of the background image varies with position, in alternative embodiments any other aspect of appearance, as well as or instead of tone, may change with position. For example, texture of the background image may vary with position.

Embodiments can implement certain functionality by means of a computer program having computer-readable instructions that are executable to perform the method of the embodiments. The computer program functionality could be implemented in hardware (for example by means of CPU), software or a mixture of hardware and software. The embodiments may also be implemented by one or more ASICs (application specific integrated circuit) or FPGAs (field programmable gate arrays).

Whilst particular units have been described herein, in alternative embodiments, functionality of one or more of those units can be provided by a single unit, processing resource or other component, or functionality provided by a single unit can be provided by two or more units or other components in combination. Reference to a single unit encompasses multiple components providing the functionality of that unit, whether or not such components are remote from one another, and reference to multiple units encompasses a single component providing the functionality of those units.

While certain embodiments have been described, these embodiments have been presented by way of example only and are not intended to limit the scope of the inventions. Indeed the novel apparatus and methods described herein may be embodied in a variety of other forms. Furthermore, various omissions, substitutions and changes to the embodiments described herein may be made without departing from the spirit of the invention. The accompanying claims and their equivalents are intended to cover such forms and modifications as would fall within the scope of the invention.

The invention claimed is:

1. An image processing apparatus comprising:
   memory configured to store medical data which is derived by imaging at least part of a subject; and
   a data processor configured to
   receive the medical data from the memory,
   identify a region of interest in the medical data, and
   generate a first medical display image to be displayed adjacent to another image, the first medical display image comprising:
      a background image representing a region outside the region of interest; and
      a foreground image derived from a portion of the medical data inside the region of interest,
      wherein a brightness of the background image between a boundary of the background image and an outer periphery of the first medical display image varies,
      wherein the background image of the first medical display image gradually changes tone towards a dominant background tone of the another image at the outer periphery of the first medical display image and an outer periphery of the another image, and
      wherein the first medical display image and the another image are separate images displayed adjacent to one another.

2. The image processing apparatus according to claim 1, wherein the brightness of the background image changes gradually with the distance from the boundary.

3. The image processing apparatus according to claim 1, wherein the appearance of the background image varies in dependence upon position relative to the boundary of the background region.

4. The image processing apparatus according to claim 1, wherein at least one of:
   a) the background image changes appearance in a region extending away from the boundary of the background image;
   b) the background image gradually changes tone in a region extending away from the boundary of the background image; or
   c) the background image changes between white and black, in a region extending away from the boundary of the background image adjacent to the foreground image.

5. The image processing apparatus according to claim 1, wherein the first medical display image is darker at the outer periphery of the first medical display image than at the boundary of the background image adjacent to the foreground image.

6. The image processing apparatus according to claim 1, wherein the first medical display image is black at the periphery of the first medical display image and white at the boundary.

7. The image processing apparatus according to claim 1, wherein the data processor is configured to conduct a position-dependent transformation in order to obtain the change in brightness.

8. The image processing apparatus according to claim 7, wherein the appearance of each background region pixel is computed in dependence on distance to a nearest foreground pixel.

9. The image processing apparatus according to claim 7, wherein the data processor is configured to conduct one or more position-dependent transformations, comprising: exponential blurring, Gaussian blurring, Lorentzian blurring, sine blurring, or a distance-based algorithm.

10. The image processing apparatus according to claim 7, wherein the proportions of first and second tones of the background image change as a function of a minimum distance from the boundary of the background image.

11. The image processing apparatus according to claim 7, wherein the data processor is configured to solve a Laplace equation, and to apply the solution to generate the background image which gradually changes tone between a first tone at a periphery of the background image and a second tone at the boundary of the background image.

12. The image processing apparatus according to claim 11, wherein the foreground image comprises an image of at least one of bone and blood vessel.

13. The image processing apparatus according to claim 1, wherein the medical data comprises at least one of pre-rendered volumetric image data, rendered volumetric image data, graph data, or parametric data.

14. The image processing apparatus according to claim 1, further comprising a user interface, wherein
   the user interface is operable to manipulate the first medical display image and generate a second medical display image in response to the manipulation, the second medical display image comprising a second background image derived from first background region data, and a second foreground image derived from the medical data.

15. The image processing apparatus according to claim 14, wherein the data processor is configured to extract the first background region data and second background region data from the medical data based on different opacity thresholds.

16. The image processing apparatus according to claim 14, wherein
   the background image of the first medical display image gradually changes tone in a region extending from the boundary of the background image, and
   the data processor is configured to cause the background image to change to a single tone at least temporarily responsive to an image manipulation input to the user interface.

17. The image processing apparatus according to claim 14, wherein the background image of the second medical display image gradually changes tone in a region extending from a boundary of the second background image.

18. The image according to claim 1, wherein the appearance of the background image is varied in dependence on the proximity of a feature of interest in the foreground image.

19. The image processing apparatus according to claim 1, wherein the first medical display image comprises a foreground image of a type comprising: X-ray image, MRI image, PET image, a 3D rendered image derived from X-ray, MRI or PET data, or graphed numerical data.

20. The image processing apparatus according to claim 1, wherein the data processor is further configured to
   extract first background region data and second background region data related to the medical data; and
   generate a medical display image comprising a first background image derived from the first background region data, a second background image derived from second background region data and a foreground image derived from the medical data.

21. The image processing apparatus according to claim 20, wherein the data processor is configured to execute a diagnostic algorithm and to thereby extract the second background region data.

22. The image processing apparatus according to claim 20, wherein the second background image draws attention to at least one feature of interest in the foreground image.

23. A method of processing medical data, comprising:
receiving the medical data from memory, the medical data being derived by imaging at least part of a subject;
identifying a region of interest in the medical data;
generating a medical display image to be displayed adjacent to another image, the medical display image comprising:
a background image representing a region outside the region of interest; and
a foreground image derived from a portion of the medical data inside the region of interest,
wherein a brightness of the background image between a boundary of the background image and an outer periphery of the medical display image varies,
wherein the background image of the medical display image gradually changes tone towards a dominant background tone of the another image at the outer periphery of the medical display image and an outer periphery of the another image, and
wherein the medical display image and the another image are separate images displayed adjacent to one another.

24. The method according to claim 23, further comprising setting the brightness of the background image to change gradually with a distance from the boundary.

* * * * *